(12) United States Patent
Weber

(10) Patent No.: US 7,989,718 B1
(45) Date of Patent: Aug. 2, 2011

(54) POWER CONTROL ENGAGEMENT DEVICE FOR A POWER TOOL

(76) Inventor: Eugene A. Weber, Palm Coast, FL (US)

( * ) Notice: Subject to any disclaimer, the term of this patent is extended or adjusted under 35 U.S.C. 154(b) by 291 days.

(21) Appl. No.: 12/437,902

(22) Filed: May 8, 2009

(51) Int. Cl.
*H01H 9/28* (2006.01)
(52) U.S. Cl. ............... 200/51 R; 200/43.16; 200/310; 200/330; 200/332.1
(58) Field of Classification Search ............... 200/51 R, 200/51.11, 43.16, 522, 308, 310, 43.17, 317, 200/330, 372.1, 372.2
See application file for complete search history.

(56) References Cited

U.S. PATENT DOCUMENTS

| | | | |
|---|---|---|---|
| 4,330,938 A * | 5/1982 | Martin | ............................. 30/169 |
| 4,370,909 A | 2/1983 | Jennings | |
| 4,603,612 A | 8/1986 | Atkins | |
| 5,875,827 A | 3/1999 | Brutscher et al. | |
| 5,894,777 A | 4/1999 | Sterling | |
| 6,181,032 B1 * | 1/2001 | Marshall et al. | ............... 307/150 |
| 6,795,994 B1 * | 9/2004 | Nahoom | ............................ 15/29 |
| 7,022,924 B2 | 4/2006 | Patton | |
| 2006/0005673 A1 * | 1/2006 | Long et al. | ......................... 83/13 |
| 2008/0110309 A1 | 5/2008 | Chang | |

* cited by examiner

*Primary Examiner* — Gary F. Paumen
(74) *Attorney, Agent, or Firm* — Sturm & Fix LLP

(57) ABSTRACT

The present invention provides a power control for a power tool having a working head for cutting or shaping a workpiece. The power control includes a trigger control switch on a hand grip attached to an engagement device such as a push stick used with a table saw. The engagement device is moved by the attached hand grip to bring the workpiece and working head into engagement with each other. The power control may be used for rip sawing or miter cutting on a table saw, on a hand-held router or a router table, on a jointer, a band saw, a disk sander, a drill press, or on other conventional power tools having a working head for cutting or shaping a workpiece.

20 Claims, 9 Drawing Sheets

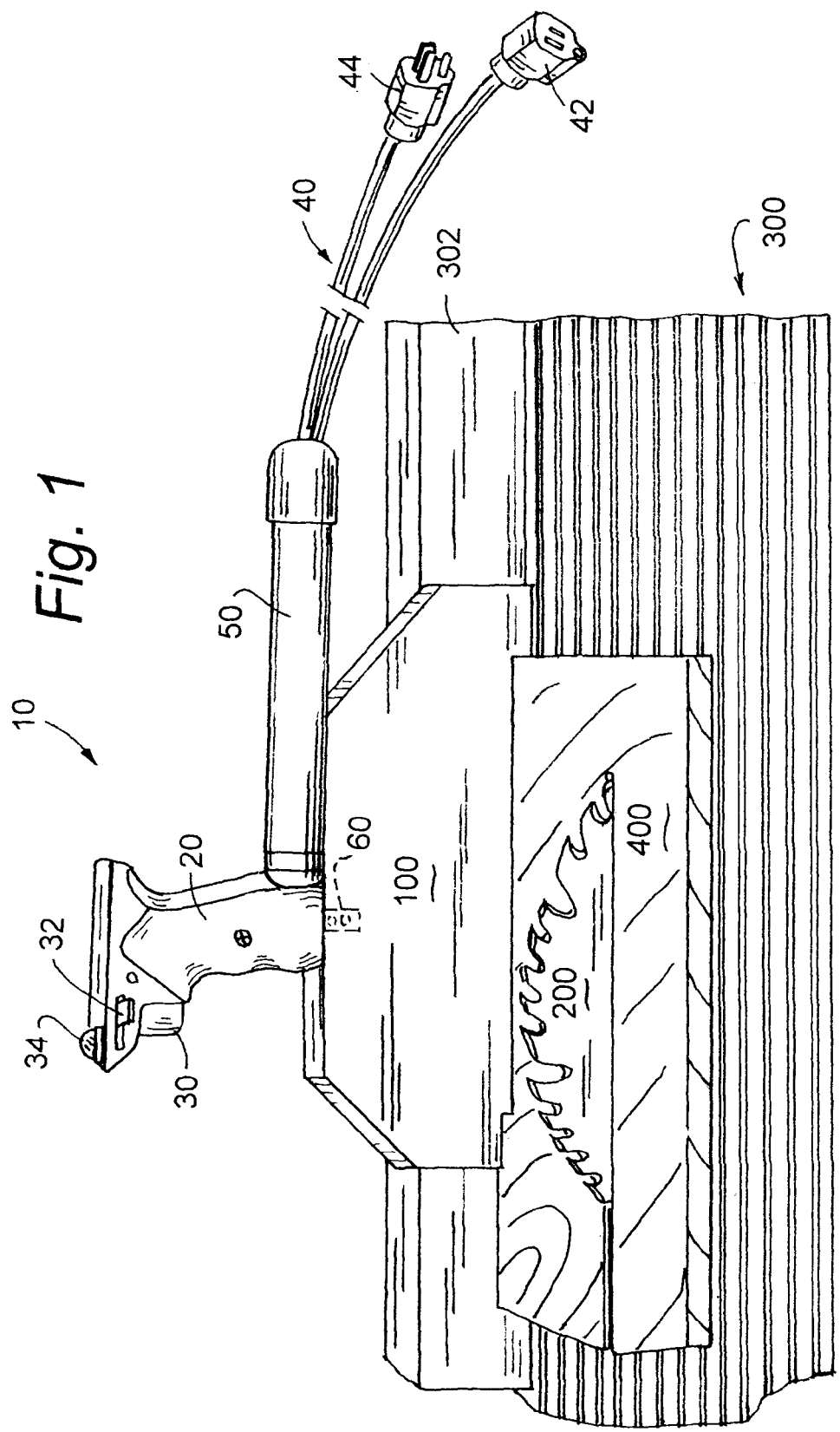

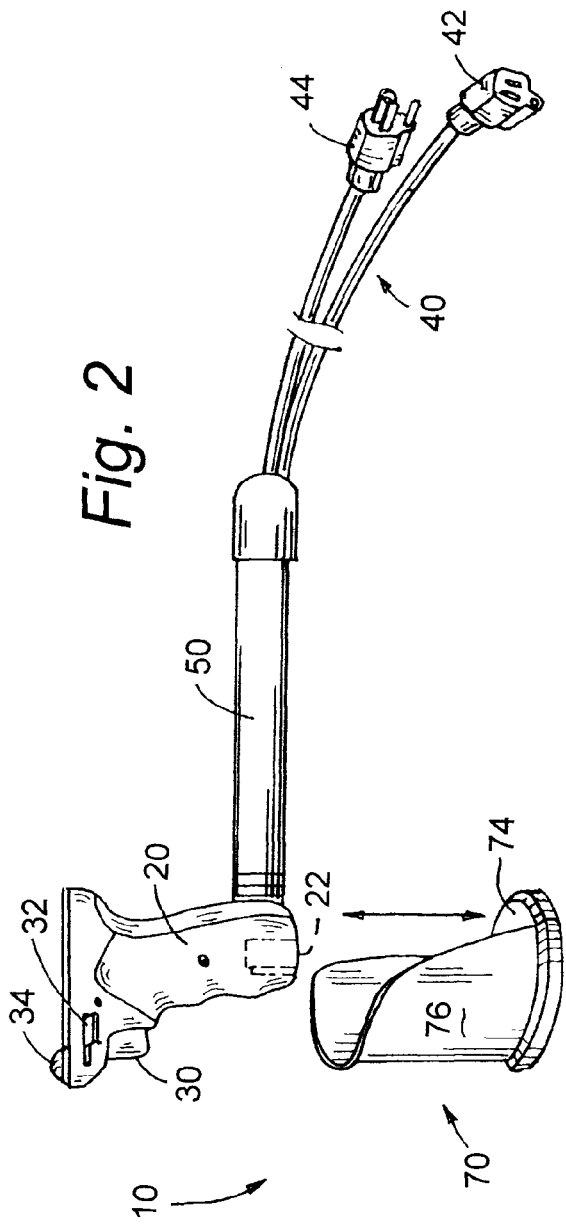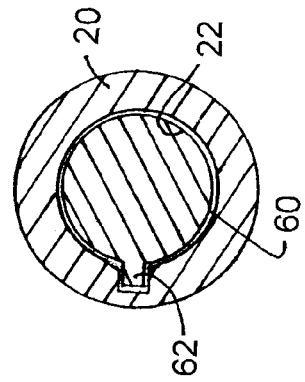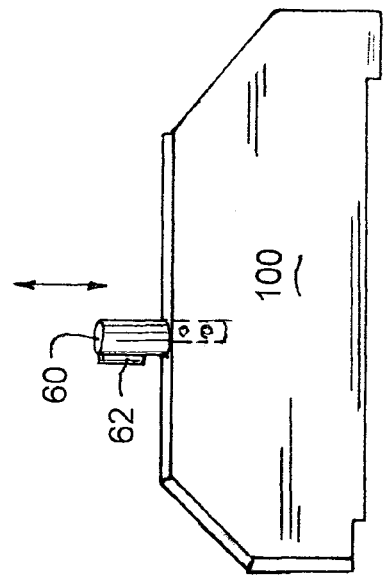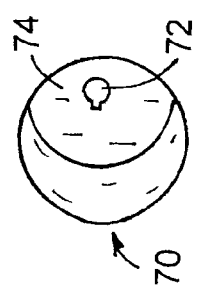

US 7,989,718 B1

POWER CONTROL ENGAGEMENT DEVICE FOR A POWER TOOL

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of power tool accessories, and more particularly to a power control engagement device for a power tool.

2. Description of Related Art

As can be seen by reference to the following U.S. Pat. Nos. 4,370,909; 4,603,612; 5,875,827; 5,894,777; 7,022,924; and U.S. Publication No. 2008/0110309, the prior art is replete with myriad and diverse power tool accessories.

While all of the aforementioned prior art constructions are adequate for the basic purpose and function for which they have been specifically designed, they are uniformly deficient with respect to their failure to provide a simple, efficient, and practical power control engagement device for a power tool.

As a consequence of the foregoing situation, there has existed a longstanding need for a new and improved power control for a power tool and the provision of such a construction is a stated objective of the present invention.

BRIEF SUMMARY OF THE INVENTION

Briefly stated, the present invention provides a power control for a power tool having a working head for cutting or shaping a workpiece. The power control includes a trigger control switch on a hand grip attached to an engagement device such as a push stick used with a table saw. The engagement device is moved by the attached hand grip to bring the workpiece and working head into engagement with each other. The power control may be used for rip sawing or miter cutting on a table saw, on a hand-held router or a router table, on a jointer, a band saw, a disk sander, a drill press, or on other conventional power tools having a working head for cutting or shaping a workpiece.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing the power control of the present invention where the engagement device is a single push stick used for passing between the table saw blade and the rip fence;

FIG. 2 is an exploded perspective view of the power control having a hand shield for the hand grip;

FIG. 3A is an enlarged sectional view showing the splined connector post that is matingly received in the cavity in the bottom of the hand grip;

FIG. 3B is a top plan view of the hand shield;

DETAILED DESCRIPTION OF THE INVENTION

Figure 4:
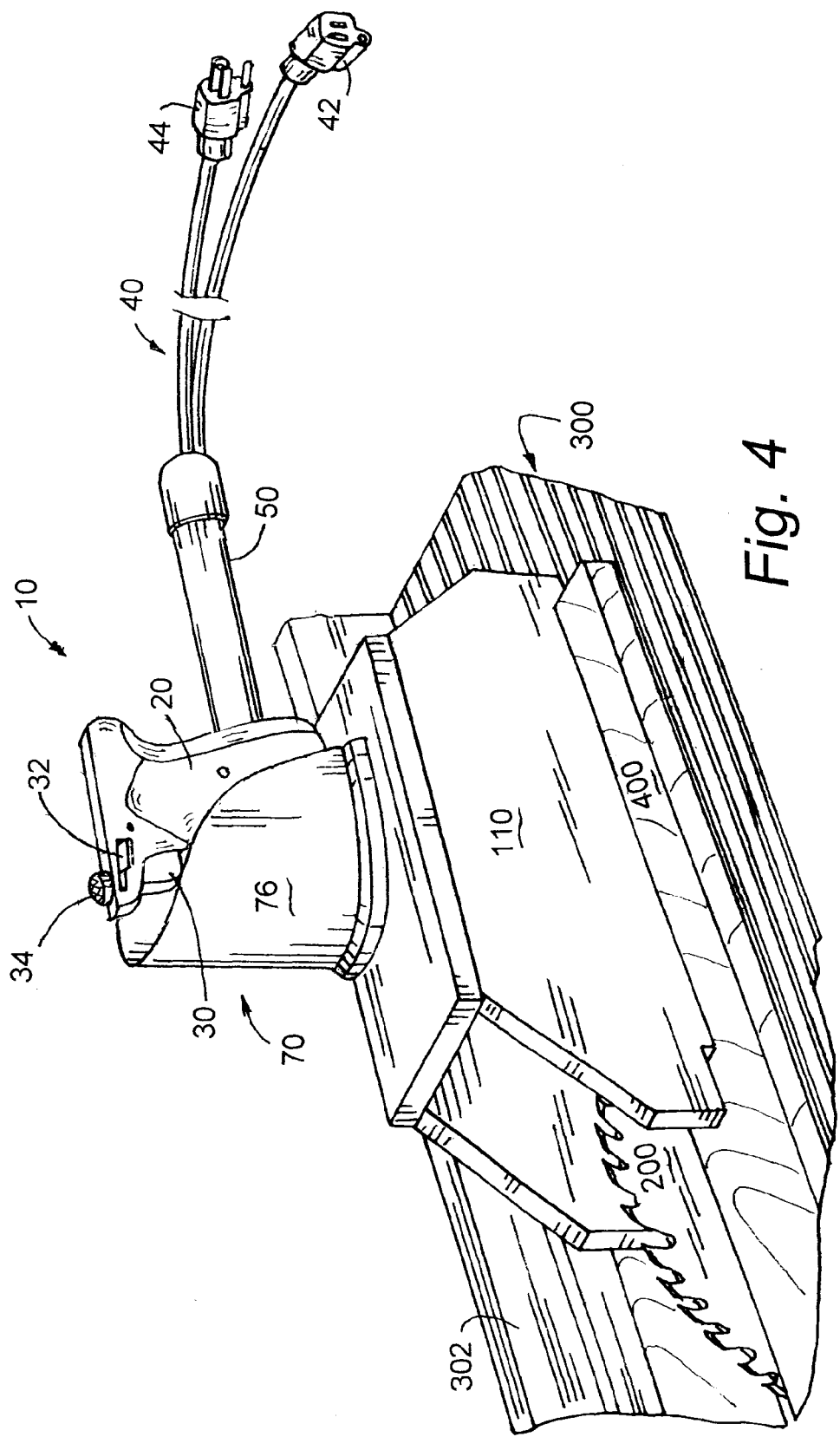
FIG. 4 is a perspective view showing the power control on a double push stick.

As can be seen by reference to the drawings, and in particular to FIG. 1, the power control that forms the basis of the present invention is designated generally by the reference number 10.

The power control 10 may be used on a number of different power tools that have a working head for cutting or shaping a workpiece. The power control 10 interconnects the power inlet to the tool and the power source that supplies electrical power.

As most clearly shown in FIG. 2, the power control 10 includes a hand grip 20 with a trigger control switch 30 that controls the supply of power through a power cord 40. Although a pistol grip style hand grip 20 is shown in the drawings, it is to be understood that other styles of hand grips could be used. The trigger control switch 30 is electronically connected to the power cord 40 at a point between the end receptacle 42 that receives the plug-in (not shown) from the tool, and the end plug-in 44 that is received in the power receptacle (not shown) of the power source. A rigid cord tube 50 is attached to and extends back from the bottom of the hand grip 20. The portions of the power cord 40 that extend from the hand grip 20 are received in the cord tube 50 to direct the power cord 40 back away from the working head of the tool. The hand grip 20 carries a trigger lock 32 that is moved to selectively allow or prevent operation of the trigger control switch 30, and a power indicator light 34 that is electrically connected to the power cord 40 to show the user that power is available.

The hand grip 20 has a cavity formed in its lower portion that matingly receives the connector post 60 that extends up from the engagement device which is illustrated in FIG. 2 as a single push stick 100. The connector post 60 carries a spline 62 that prevents the hand grip 20 from rotating with respect to the single push stick 100 (FIG. 3A). A hand shield 70 is secured in position forward of the hand grip 20 by sliding the connector post 60 through an opening 72 in the floor 74 of the shield 70 (FIG. 3B). The hand grip 20 snaps into position holding the shield 70 in place. This positions the vertical face 76 of the shield 70 between the user's hand and the working head of the tool illustrated in FIG. 4 as the blade 200 of a table saw 300.

FIG. 1 shows the power control 10 of the present invention used on an engagement device shown as a single push stick 100. This engagement device 100 moves the workpiece 400 into engagement with the working head 200 that cuts the workpiece 400. Note that the hand shield 70 is not shown in FIG. 1 and other FIGS. so that the power control 10 can be more clearly shown. The single push stick 100 is positioned between the blade 200 and the rip fence 302 to make narrow rip cuts. The power control 10 may be used on a number of different power tools using a variety of different engagement devices.

Figure 5:
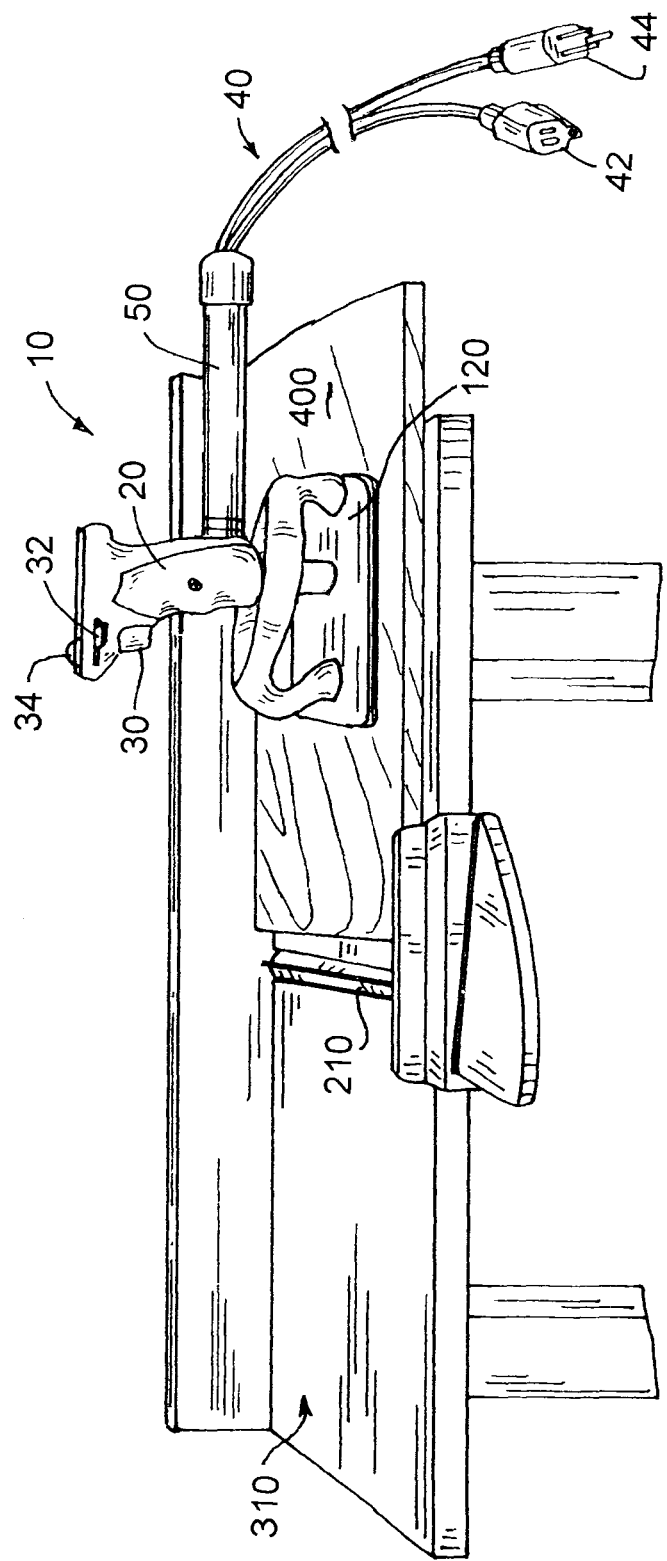
FIG. 5 is a perspective view showing the power control on a jointer.
Figure 6:
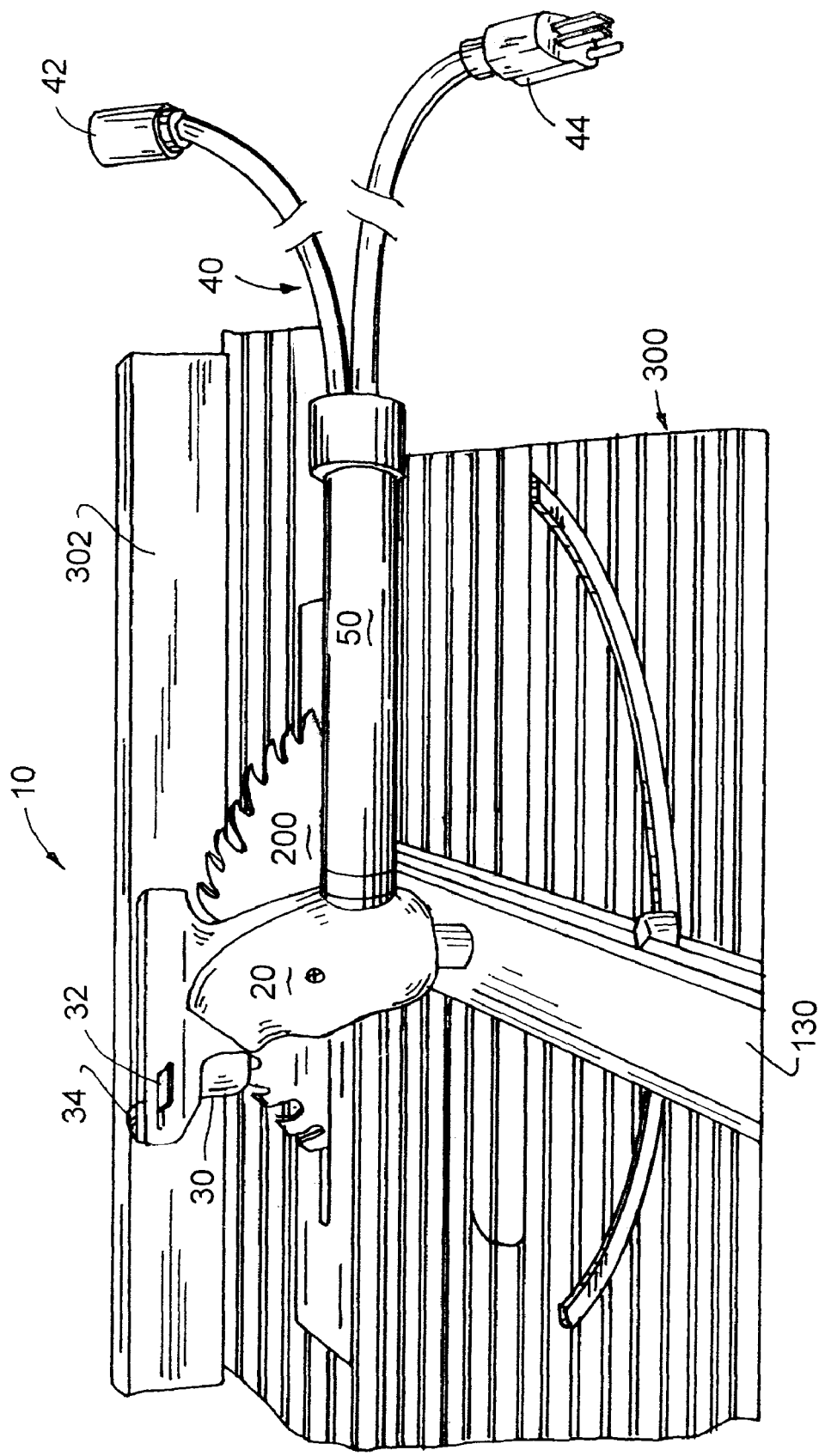
FIG. 6 is a perspective view showing the power control on a table miter.
Figure 7:
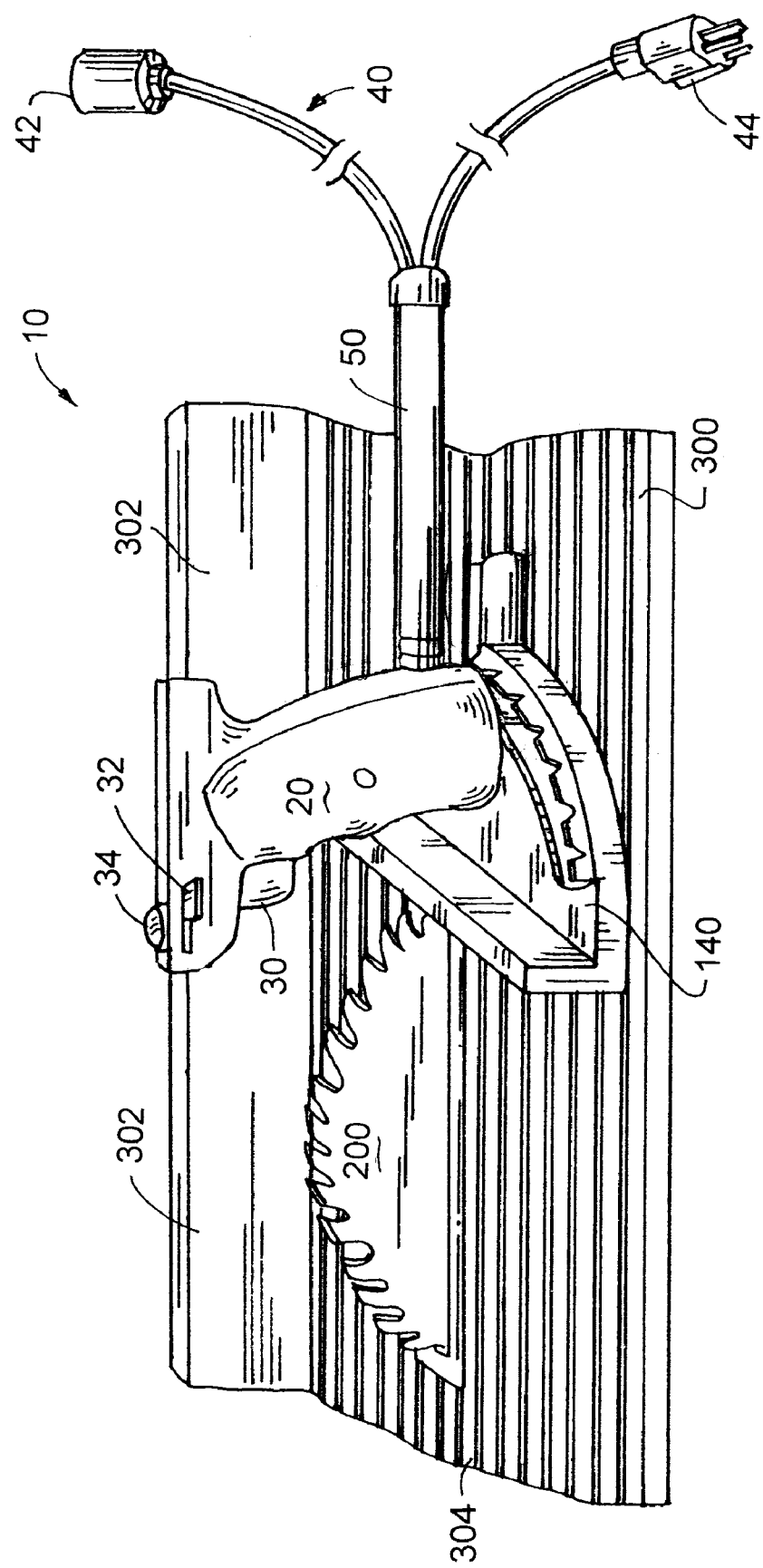
FIG. 7 is a perspective view showing the power control on a conventional miter.
Figure 8:
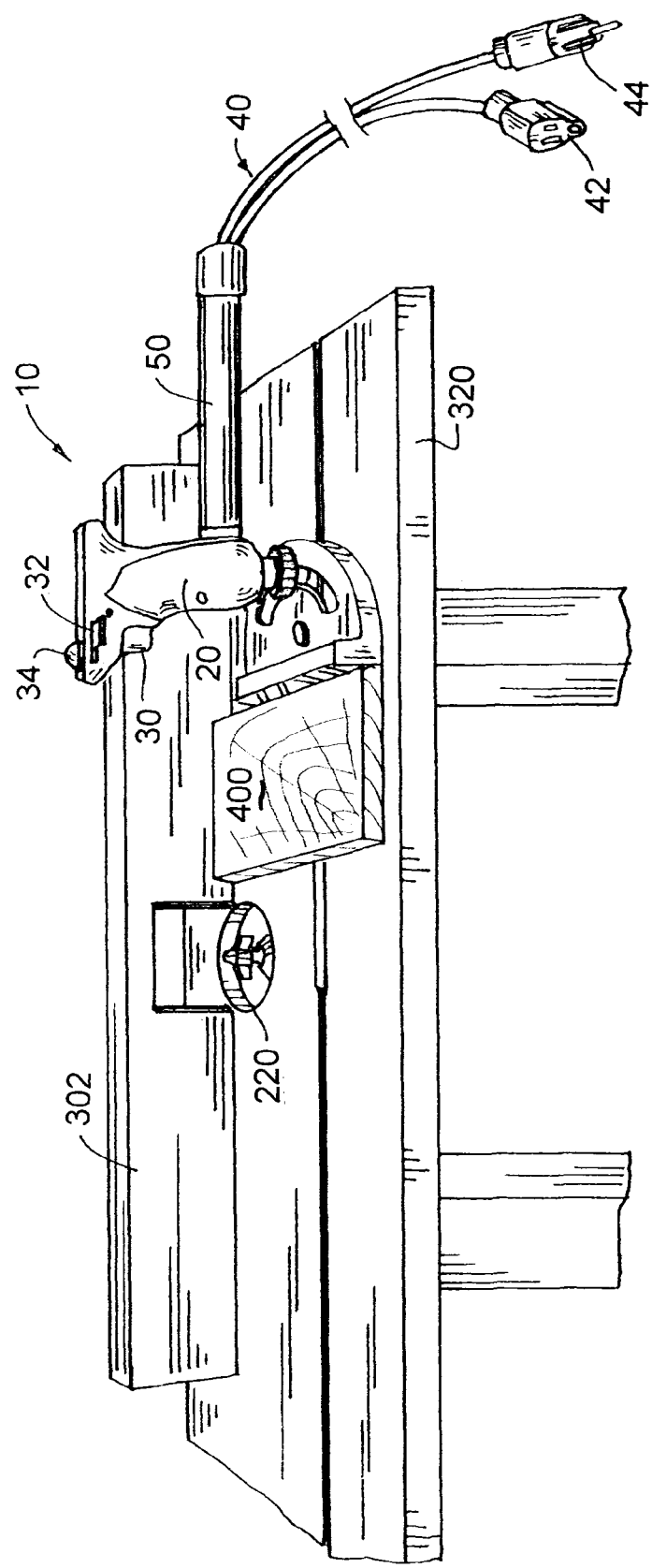
FIG. 8 is a perspective view showing the power control on a router table.

FIG. 4 shows the power control 10 used on the engagement device shown as a double push stick 110. FIG. 5 shows the power control 10 on a jointer push device 120 of a jointer 310 with a jointer blade 210. FIG. 6 shows the power control 10 on a miter extension 130 of a table saw 300. FIG. 7 shows the power control 10 on a miter guide 140 that travels in a miter slide 304 formed in the table of the table saw 300. FIG. 8 shows the power control 10 on a lever 160 of a drill press 330 with a drill bit 230. Certain pieces of equipment such as miter extension 130 or miter guide 140, and a drill press lever 160 require the hand grip 20 to rotate with respect to the engagement device, and the spline 62 is therefore not used on the connector post 60.

Figure 9:
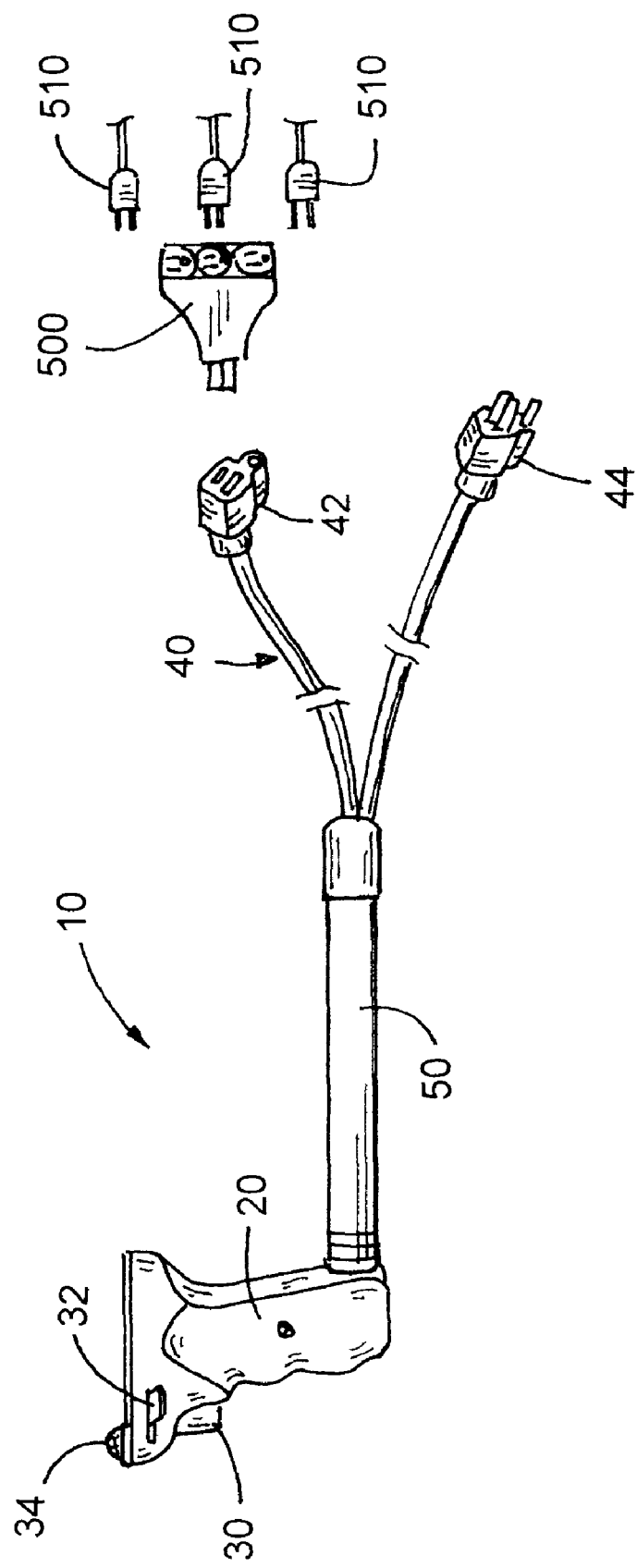
FIG. 9 is a perspective view illustrating use of the power control to simultaneously control multiple pieces of equipment.
Figure 10:
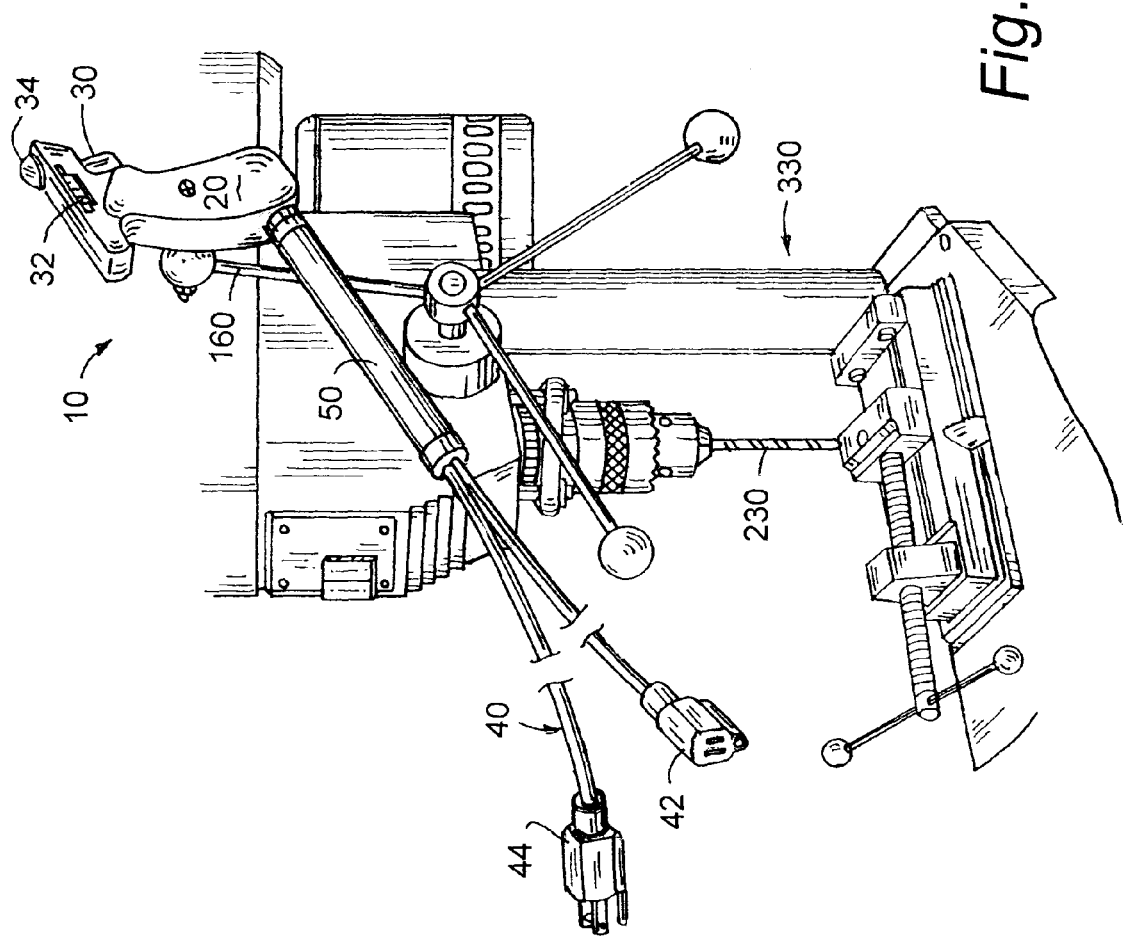
FIG. 10 is a perspective view showing the power control on a drill press.

FIG. 9 illustrates that the power control 10 may be used to simultaneously control several pieces of equipment by using a power strip 500 to electrically connect the plug-ins 510 from various tools and accessories. For example, a saw, a vacuum to remove saw dust, and a light for saw operation could all remain off until the user activates the trigger control switch 30.

The power control 10 of the present invention may be used for rip sawing or miter cutting on a table saw 300, used on a router table 320, hand-held router, jointer 310, band saw, disk sander, drill press 330, and any of a number of other power tools and accessories. The user is always in full control of the equipment with the on/off switch at their fingertips at all times, resulting in improved control, safety and confidence. The user's attention is never diverted from the work operation while trying to locate an on/off switch. Also, the equipment remains off until the operator is ready to engage the workpiece which saves electricity and wear and tear on the equipment. The operator's hand is protected by a steel shield, and does not need to be released from the engagement device to turn the power on or off. If the user is incapacitated, the equipment will automatically shut off. Further, the trigger lock prevents accidental operation, and the power indicator light alerts the user that power is available. The power control does not use batteries so the danger of batteries going dead during operation is eliminated. Also, the power control may be changed from one tool to the next in seconds. The power control acts to reduce operator stress and fatigue and results in safe operation of all potentially dangerous equipment.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A power control for a power tool having a working head for cutting or shaping a workpiece, and a power inlet for electrical connection to a power source, the power control comprising:
    an engagement device disposed to move the workpiece into engagement with the working head;
    a connector post attached to and extending from the engagement device;
    a hand grip mounted on the connector post;
    an elongated cord disposed to extend into the hand grip, and having end connectors extending from the hand grip for electrically interconnecting the power inlet of the power tool and the power source; and
    a trigger control switch disposed on the hand grip and being electrically connected to the power cord.

2. The power control of claim 1, further including a hand shield attached to a forward portion of the hand grip.

3. The power control of claim 1, further including a power indicator light disposed on the hand grip, and being electrically connected to the power cord.

4. The power control of claim 1, further including a rigid cord tube attached to and extending rearwardly from the hand grip, the cord tube being disposed to receive portions of the power cord extending from the hand grip.

5. The power control of claim 1, further including a trigger lock attached to the hand grip and being disposed to selectively engage the trigger control switch.

6. The power control of claim 1, wherein the hand grip includes a cavity formed in a lower portion thereof, the hand grip being removably mounted on the connector post by engagement of the connector post within the cavity.

7. The power control of claim 6, wherein the power tool is selected from a group consisting of a table saw, a router table, a hand held router, a jointer, a band saw, a disk sander, and a drill press.

8. The power control of claim 6, wherein the connector post carries a spline disposed to matingly engage an axial slot disposed within the cavity.

9. The power control of claim 1, wherein the engagement device is selected from a group consisting of a single push stick, a double push stick, and a jointer push device.

10. The power control of claim 8, wherein the engagement device is selected from a group consisting of a single push stick, a double push stick, and a jointer device.

11. The power control of claim 1 wherein the engagement device is selected from a group consisting of a miter extension for a table saw, a miter guide for a table saw, and a drill press lever.

12. The power control of claim 3, further including a hand shield attached to a forward portion of the hand grip.

13. The power control of claim 4, further including a hand shield attached to a forward portion of the hand grip.

14. The power control of claim 5, further including a hand shield attached to a forward portion of the hand grip.

15. The power control of claim 2, further including a power indicator light disposed on the hand grip, and being electrically connected to the power cord.

16. The power control of claim 4, further including a power indicator light disposed on the hand grip, and being electrically connected to the power cord.

17. The power control of claim 5, further including a power indicator light disposed on the hand grip, and being electrically connected to the power cord.

18. The power control of claim 2, further including a rigid cord tube attached to and extending rearwardly from the hand grip, the cord tube being disposed to receive portions of the power cord extending from the hand grip.

19. The power control of claim 3, further including a rigid cord tube attached to and extending rearwardly from the hand grip, the cord tube being disposed to receive portions of the power cord extending from the hand grip.

20. The power control of claim 5, further including a rigid cord tube attached to and extending rearwardly from the hand grip, the cord tube being disposed to receive portions of the power cord extending from the hand grip.

* * * * *